United States Patent
Goy et al.

(10) Patent No.: US 6,196,628 B1
(45) Date of Patent: Mar. 6, 2001

(54) DEVICE FOR FIXING A CHILD SEAT TO THE SEAT OF A MOTOR VEHICLE

(75) Inventors: Reinhard Goy, Kaiserslautern; Michael Lebkücher, Mehlingen/Baalborn; Ralf Liedhegener, Trippstadt; Peter Reimer, Grosskarlbach, all of (DE)

(73) Assignee: Keiper GmbH & Co., Remscheid (DE)

( * ) Notice: Subject to any disclaimer, the term of this patent is extended or adjusted under 35 U.S.C. 154(b) by 0 days.

(21) Appl. No.: 09/462,242
(22) PCT Filed: Mar. 6, 1999
(86) PCT No.: PCT/EP99/01454
  § 371 Date: Jan. 5, 2000
  § 102(e) Date: Jan. 5, 2000
(87) PCT Pub. No.: WO99/59837
  PCT Pub. Date: Nov. 25, 1999

(30) Foreign Application Priority Data

May 16, 1998 (DE) ............................................. 198 22 134

(51) Int. Cl.⁷ ..................................................... B60N 2/28
(52) U.S. Cl. .......................................... 297/253; 297/250.1
(58) Field of Search .................. 297/250.1, 253, 297/256.16, 216.11

(56) References Cited

U.S. PATENT DOCUMENTS 5,669,663 * 9/1997 Feuerherdt ................... 297/250.1 X
5,941,601 * 8/1999 Scott et al. ................... 297/250.1 X

FOREIGN PATENT DOCUMENTS 4427768    11/1995 (DE).
196 50 087
      C1   12/1997 (DE).
0417394     3/1991 (EP).

* cited by examiner

Primary Examiner—Peter R. Brown
(74) Attorney, Agent, or Firm—Friedrich Kueffner

(57) ABSTRACT

The fastening device consists of at least one retaining element 13 attached to the seat of the vehicle, this element holding a fastening element 14, which can be moved between a service position and an out-of-service position (parking position).

So that the fastening element 14 can be moved easily into the service position and then again into the parking position without the need for any force-transferring element installed at a remote location, the fastening element 14 is connected to the retaining element 13 by means of a latching mechanism 17, which makes it possible for the fastening element 14 to be lowered into a parking position and returned to a service position.

6 Claims, 4 Drawing Sheets

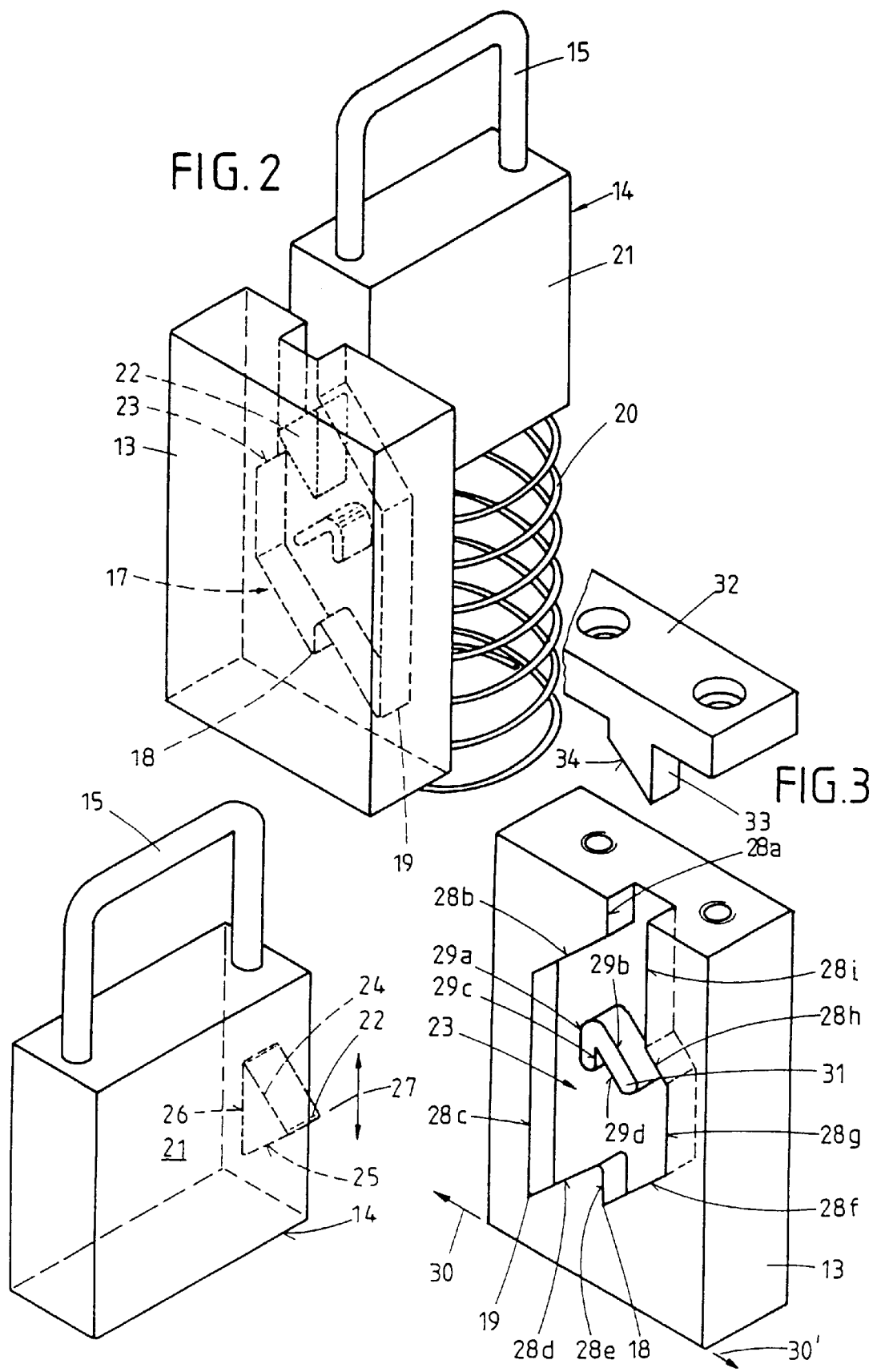

DEVICE FOR FIXING A CHILD SEAT TO THE SEAT OF A MOTOR VEHICLE

BACKGROUND OF THE INVENTION

1. Field of the Invention

The invention pertains to a fastening device for fastening a child's seat to the seat of a vehicle by means of at least one retaining element which is attached to the vehicle seat and which holds a fastening element which can be moved between a service position and an out-of-service ("parking") position.

2. Description of the Related Art

The usual method for attaching a child's seat to the seat of a motor vehicle is to use the available safety belt. This type of attachment, however, is unsatisfactory with respect to behavior during a crash. During a collision, deceleration occurs as the crumple zones of the vehicle undergo deformation and thus absorb energy, whereas the passengers do not begin to undergo deceleration until after the slack in their safety belts has been taken up. When a child's seat is attached to the vehicle by the same type of belt, however, the slack in this belt must be taken up first under the load of the child's seat, then the slack in the safety belt of the child's seat itself must be taken up. This means the child in the seat decelerates after the adults and thus the deceleration takes place when the crumple zone is no longer absorbing a great deal of energy, with the result that the child must endure the residual load of the deceleration process until a full stop is reached. It has already been proposed that two fastening elements on the vehicle seat in the form of yokes be permanently attached to the vehicle structure or seat. These permanent yokes, however, are a nuisance during the times when no child's seat is buckled into the vehicle seat and an adult passenger is using this seating area instead.

It has therefore already been proposed that fastening elements in the form of yokes be pivoted into a "parking" (stowed or out-of-service) position; these fastening elements would be adjacent to the long sides of the seats and be installed in the rear area of the seat between the back and the seat cushion. When the user wishes to attach the child's seat, the fastening elements would be swung up out of the gap between the seat cushion and the back and into the service position, where they project out over the seat cushion to allow the attachment of the child's seat. After the fastening elements are pivoted back into the parking position in the gap between the back and the seat cushion, they are held in place there by a detent pawl. This pawl is located in an inaccessible place, however, which means that the user of the seat can operate it only by pulling on a Bowden cable connected to a release lever. A comparable fastening device is described in DE 196-50,087 C1.

SUMMARY OF THE INVENTION

The task of the invention is to improve a fastening device of the type described above in such a way that the user of the seat can operate it easily without the need to actuate locking elements which must be released before-hand. This task is accomplished by means of the fastening element being connected to the retaining element by a latching mechanism, by means of which the fastening element can be lowered into a stowed position and returned to a service position. The retaining element can be easily installed by attaching it to the support structure of the seat or to the car body; it is advisable for one retaining element to be located near each long side of the seat. Because of the latching mechanism located between the fastening element and the retaining element, the fastening element effectively connected to each retaining element can be easily moved into the parking position and then again into the service position simply by pressing on it, which means that additional operating components for arriving at the two positions of the fastening element can therefore be completely omitted.

In a preferred embodiment of the object of the invention, the latching mechanism between the fastening element and the retaining element is designed as a two-stage mechanism, the first latching stage of which makes it possible to move the fastening element into the stowed position, whereas the second latching stage allows the fastening element to be moved into the service position. The fastening element has a base body, which is acted on by an energy storage mechanism which attempts to push the base body in the direction of the service position. A yoke is attached to the base body. The fastening device also has a control tappet, which can slide in linear fashion in a control link of the retaining element, which is mounted on the vehicle seat in such a way that it can slide transversely to the fastening element.

It is advantageous for the control tappet projecting from the base body of the fastening element to have a cross section in the form of an isosceles triangle, where the base which connects the two equal sides extends in the direction of the linear movement of the fastening element. It is advantageous for the control link which accepts the control tappet to consist of a guideway with both outer control surfaces and the inner control surfaces, the inner control surfaces being formed by an angled projection; these outer and inner control surfaces, furthermore, alternate in their directions, proceeding first in a linear manner in the direction in which the control tappet moves and then proceeding at a slant, in the same direction as that of one or the other of the equal sides of the triangular control tappet.

To secure the fastening element with its yoke in the first latching position, in which the yoke is recessed into the seat part, and also to move it reliably into the second latching position, in which the yoke projects out of the seat part, the control surface of the angled projection facing the latching stages extends over certains areas of the two control surfaces of the latching stages, the two of which both slant in the same direction, but is itself slanted in the direction opposite that of the control surfaces of the latching stages. This slanted control surface of the angled projection, furthermore, is limited by a linear control surface extending in the direction in which the control tappet moves and is pointed toward the slanted control surface of the second latching stage. The position of the yoke on the fastening element which corresponds to the second latching position, i.e., the position in which the yoke is pulled out over the top surface of the seat, is limited by an upper stop in the path of the control tappet of the fastening element, this stop being connected to the retaining element so that it remains permanently attached to it. To ensure the interference-free movement of the control tappet in the control link, the distance between the outer and inner control surfaces of the control link is made large enough to allow smooth passage of the control tappet.

In another embodiment of the object of the invention, a latching mechanism is used which makes it possible for the fastening element, with its yoke, to be supported pivotably on the retaining element in a plane perpendicular to the surface of the seat, where, as a result of the latching mechanism, the fastening element, i.e., its yoke, can be moved either into an upward-projecting service position or into a stowed position, folded down onto the surface of the seat. So that the user of the seat will not be disturbed by the fastening element while the element is not in use, the surface of the seat has a recess to hold the yoke of the fastening element while it is in the stowed position.

BRIEF DESCRIPTION OF THE DRAWING

The invention is illustrated in the drawing and explained in greater detail below on the basis of exemplary embodiments:

FIG. 2 shows the latching mechanism, designed as a two-stage mechanism, by means of which the fastening element, upon which an energy storage mechanism in the form of a helical compression spring acts, can be held on the retaining element in two different latching positions, the above-cited components being shown in perspective;

FIG. 3 shows separate views, in perspective, of the fastening element and the retaining element as mirror images of the view of FIG. 2 together with a stop plate shown in an exploded view with respect to the retaining element;

DESCRIPTION OF THE PREFERRED EMBODIMENT

Figure 1:
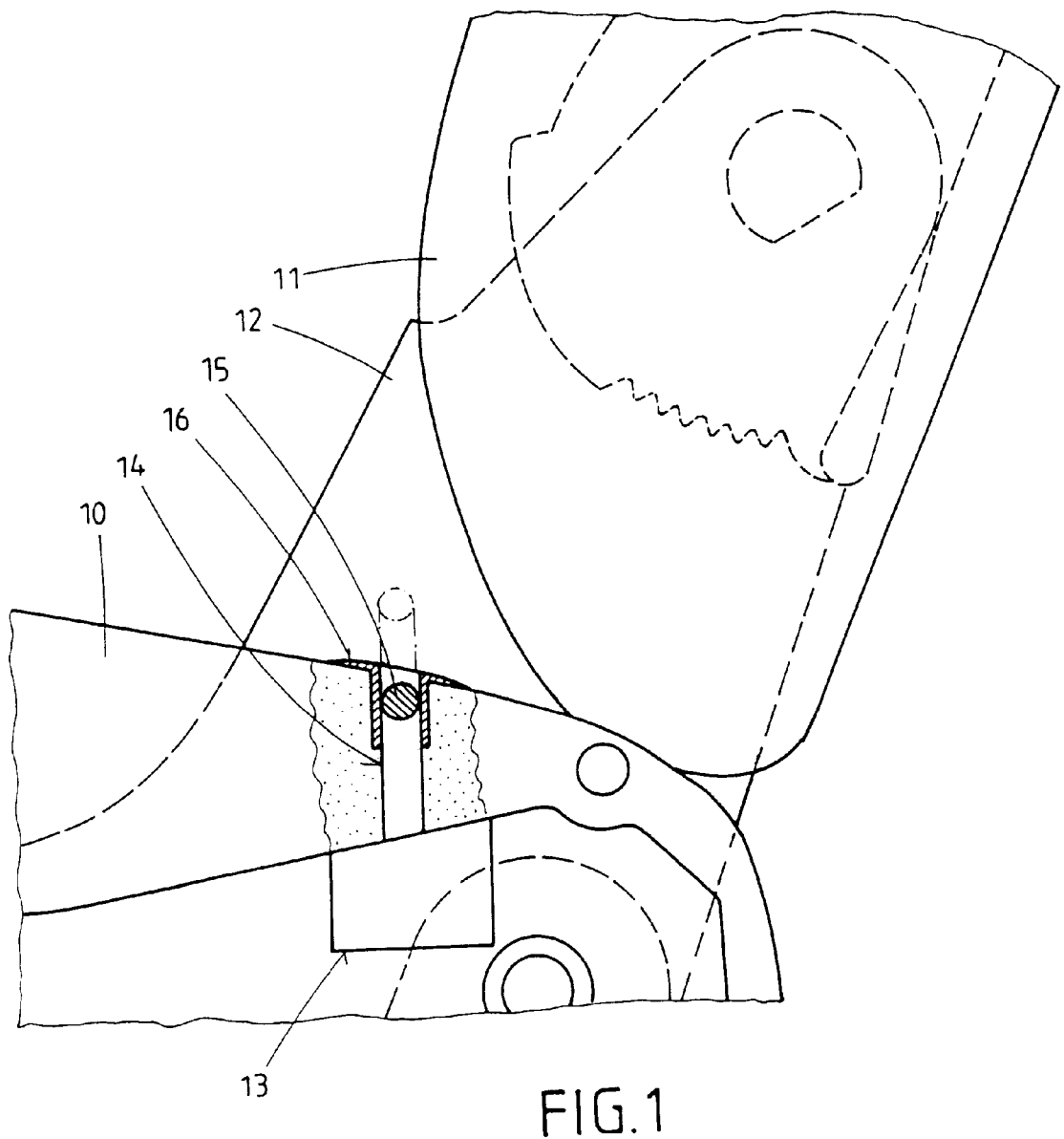
FIG. 1 shows a schematic side view of the rear seat area between the seat back and the seat part, where the retaining element attached to the seat part holds the fastening element in the pushed-in position.

Attention is drawn first to the fact that the fastening device for a child's seat illustrated here and described in greater detail below is an exemplary embodiment of the object of the invention and can therefore also have a design different from that shown, as has already been suggested above. In particular, the seat, formed out of a seat part and a back part, can be designed in the standard manner, and the fittings connecting the seat part to the back can be fabricated in such a way as to allow the angle of the back part to be adjusted in the known manner. In addition, the fastening device for a child's seat is not limited to use on the front passenger seat or to the rear seats of motor vehicles; on the contrary, the fastening device can also be used on any seats suitable for carrying passengers in other forms of transportation such as buses, trains, and planes. The embodiments of fastening devices explained in the drawings here, however, are based on the example of the front passenger seat of a motor vehicle.

In the rear area of the seat part 10, a retaining element 13 is installed on the seat part 10, usually near each of the two long sides of the seat. A piece of hinge hardware 12 of the seat back 11, the angle of which is adjustable, can be used as the attachment point, but the retaining element could also be attached to the seat back or to the car body. In the case of the exemplary embodiment shown in FIGS. 1–4H, this retaining element 13 can be moved horizontally but is held permanently in the vertical position on the seat part 10. The fastening element 14 for the child's seat is effectively connected to the retaining element 13 so that it can be moved vertically, but it is fixed horizontally in the seat part 10. The yoke 15 of the fastening element 14 can project out above the surface of the seat part 10. The gap in the upholstery of the seat part 10 where the yoke 15 is held is covered by a grommet plate 16.

FIG. 2 shows the effective connection between the retaining element 13 and the fastening element 14. This effective connection is accomplished by a latching mechanism 17, which is designed as a two-stage mechanism. The first latching stage 18 of the mechanism cooperates with a compression spring, which forms an energy storage mechanism 20 and attempts to push the fastening element 14 outward; this stage makes it possible for the fastening element 14 to be returned to the stowed position shown in FIG. 1. By means of the second latching stage 19, it is possible for the fastening element with its yoke 15 to be moved into the service position shown in FIG. 2 with the help of the energy storage mechanism 20. The latching mechanism 17 consists—as is especially clear from FIG. 3—of a control tappet 22, projecting out from the base body 21 of the fastening element 14; this tappet engages a control link 23 located in the retaining element 13. The control tappet 22 projecting out from the base body 21 has a cross section in the form of an isosceles triangle; the base 26, which connects the two equal sides 24 and 25, extends in the direction of linear motion of the fastening element 14, indicated by the double arrow 27 in FIGS. 3 and 4A. The control link 23 of the retaining element 13, which can slide horizontally in the direction of arrows 30 and 30', has a guideway, which is limited by outer control surfaces 28a–28i and by inner control surfaces 29a–29d. The inner control surfaces 29a–29d are components of an angled projection 31, which projects into the interior of the control link 23. The outer control surfaces 28a, 28c, 28e, 28g, and 28i all extend in straight lines and are parallel to the base 26 of the triangular control tappet 22. The outer control surfaces 28b, 28d, and 28f proceed at an angle and are parallel to the side 25 of the control tappet 22. The control surfaces 29a and 29c also form straight lines parallel to the base 26 of the control tappet 22, forming part of the inside boundary of the guideway around angled projection 31. The inner control surfaces 29b and 29d on angled projection 31 proceed at an angle, namely, parallel to the side 24 of the control tappet 22. Finally, it can also be derived from FIG. 3 that the guideway in the retaining element 13, which is open at the top, can be closed off by a stop plate 32, which can be permanently connected to the retaining element 13 by screws, for example. The stop plate 32 has a projection 33, which fits into the guideway between the control surfaces 28a and 28i. The bottom side 34 of this projection is parallel to the side 24 of the control tappet 22 and thus limits the extent to which the fastening element 14 can be lifted when it is being moved into the service position.

Figure 4A:
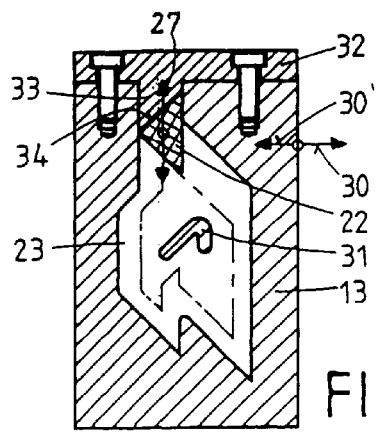
FIGS. 4A–4H show a cross section of the retaining element and its control link, with a control tappet engaging in the control link in eight different positions, which mark the passage of the control tappet through the control link, the route of the control tappet being shown in dash-dot line in FIG. 4A.
Figure 4E:
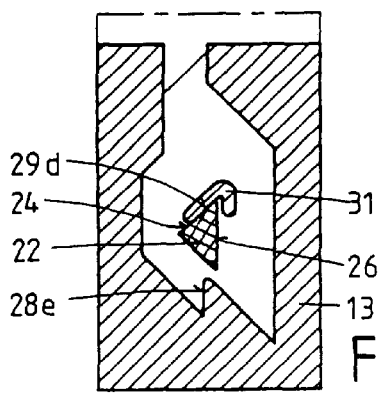
Figure 4B:
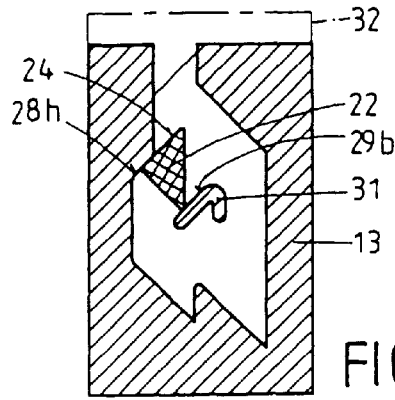
Figure 4F:
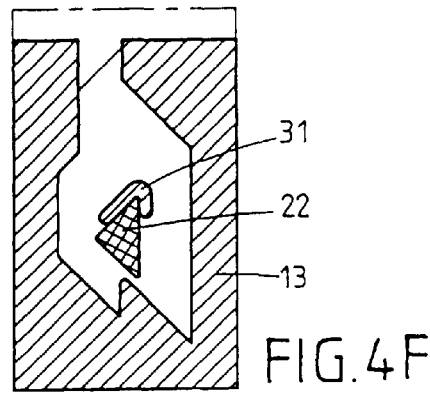
Figure 4C:
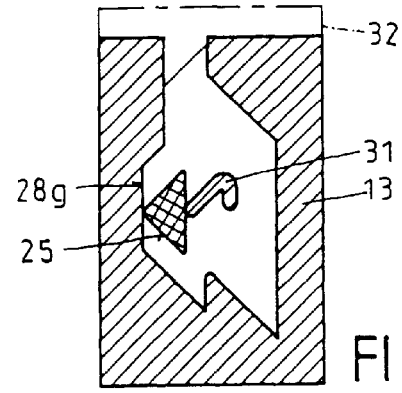

The angled projection 31 in the interior of the control link 23 is designed in such a way that, when the fastening element 14 is moved from the service position into the parking position, the lower tip of the control tappet 22 first strikes the control surface 29b of the angled projection 31 and, as it slides farther down this surface, simultaneously causes the retaining element 13 to move transversely in the direction of arrow 30. The route of the control tappet 22 around the guide path of the control link 23 can best be seen on the basis of the dash-dot lines of FIG. 4A–4H, which show the retaining element 13 in vertical cross section and also show how the control tappet 22 of the fastening element 14 engages the control link 23. In the diagram of FIG. 4A, the control tappet 22 is in its upper position, which corresponds to the position of yoke 15 of fastening element 14 shown in dashdot line in FIG. 1. In this position, the side 24 of the control tappet 22 on the fastening element 14, which is being acted on by the pressure storage mechanism 20, is resting against the bottom surface 34 of the projection 33 of the stop plate 32, which is permanently connected to the retaining element 13. When the yoke 15 is now pressed down against the force of the pressure storage mechanism 20 and thus moved out of the position shown in dash-dot line, the lower tip of the control tappet 22 first strikes the slanted control surface 29b of the angled projection 31 parallel to the side 24 and begins to push the retaining element 13 toward the right in the direction of arrow 30. As the yoke 15 is pushed even farther down, the control tappet 22 also moves farther down, and the retaining element 13 is simultaneously pushed farther toward the right in the direction of arrow 30 until the lower corner of the control tappet 22 leaves the control surface 29b. When this happens, the control tappet 22 enters the free space between the angled projection 31 and the control surface 28g, which extends in a straight line parallel to the base 26 of the triangle. This position is shown in FIG. 4C. Finally, the side 25 of the control tappet 22 strikes the control surface 28f, which slants in the same direction, and slides along this into the position shown in FIG. 4D, in which the lower tip of the control tappet 22 has reached the first latching stage 18 and the retaining element 13 has moved back again somewhat in the direction of the arrow 30' toward the left. In this position, the yoke 15 and thus also the control tappet 22 can no longer be pressed down any farther, with the result that the operator lets go of the yoke 15. As soon as the spring force of the energy storage mechanism 20 is no longer being counteracted, this force is able to push the fastening element 14 back up to a certain extent; it continues pushing until the base 26 of the triangle has risen above the control surface 28e. The side 24 then starts to slide up along control surface 29d; and, passing beyond the situation shown in FIG. 4E, the control tappet 22 finally reaches the latching position on the angled projection 31 shown in FIG. 4F. In this position, shown in FIG. 4F, the base body 21 of the fastening element 14 with the yoke 15 is in its parking position underneath the surface of the seat part 10, as can be seen in FIG. 1.

Figure 4G:
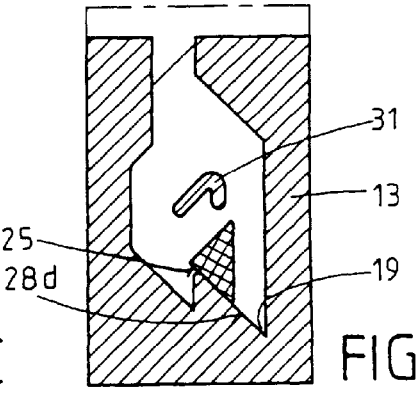
Figure 4D:
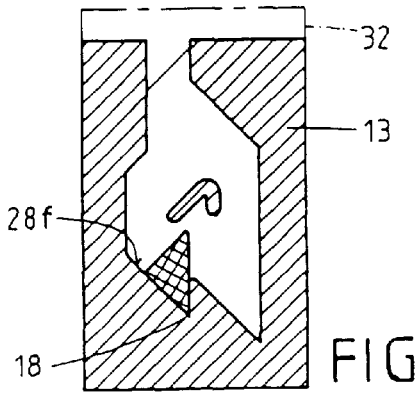
Figure 4H:
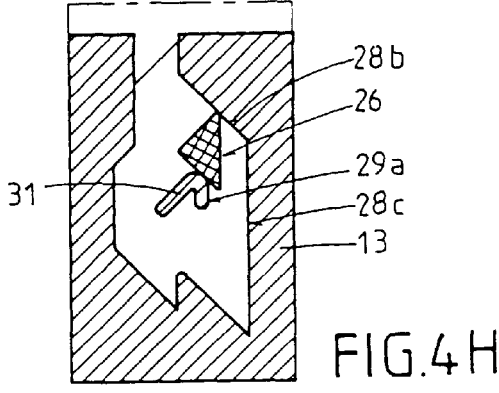

When the fastening element 14 is now to be moved out of its parking position and into the service position, the yoke 15 is pushed down again against the force being exerted by the pressure storage mechanism 20. As this happens, the side 25 of the control tappet 22 strikes the control surface 28d of the control link 23 and slides down along it, thus causing the retaining element 13 to slide further in the direction of the arrow 30'. The tappet then breaks contact with the angled projection 31 completely. This position is shown in FIG. 4G. As a result of the further linear displacement of the control tappet 22 in the downward direction, the lower tip of the tappet finally arrives in the second latching stage 19, accompanied by further displacement of the retaining element 13 toward the left, so that it is now no longer possible to push the yoke 15 (and thus the control tappet 22) down any farther against the force of the pressure storage mechanism 20. When the user now lets go of the yoke 15, the pressure storage mechanism 20 pushes the base body 21 and thus also the control tappet 22 upward; the base 26 of the triangle then slides upward along the control surface 28c, passing through the opening between the control surface 29a of the angled projection 31 and the control surface 28c of the control link 23. Then it begins to slide between the angled projection 31 and the control surface 28b under simultaneous displacement of the retaining element 13 in the direction of the arrow 30. This position is shown in FIG. 4H. The energy storage mechanism 20, however, continues to push the control tappet 22 straight up, which also means the retaining element 13 is pushed farther toward the right in the direction of arrow 30 until finally the position of control tappet 22 shown in FIG. 4A is reached again, with the tappet resting against the bottom surface 34 of the projection 33 of the stop plate 32. In this position, the yoke 15 is again in its service position.

Figure 5:
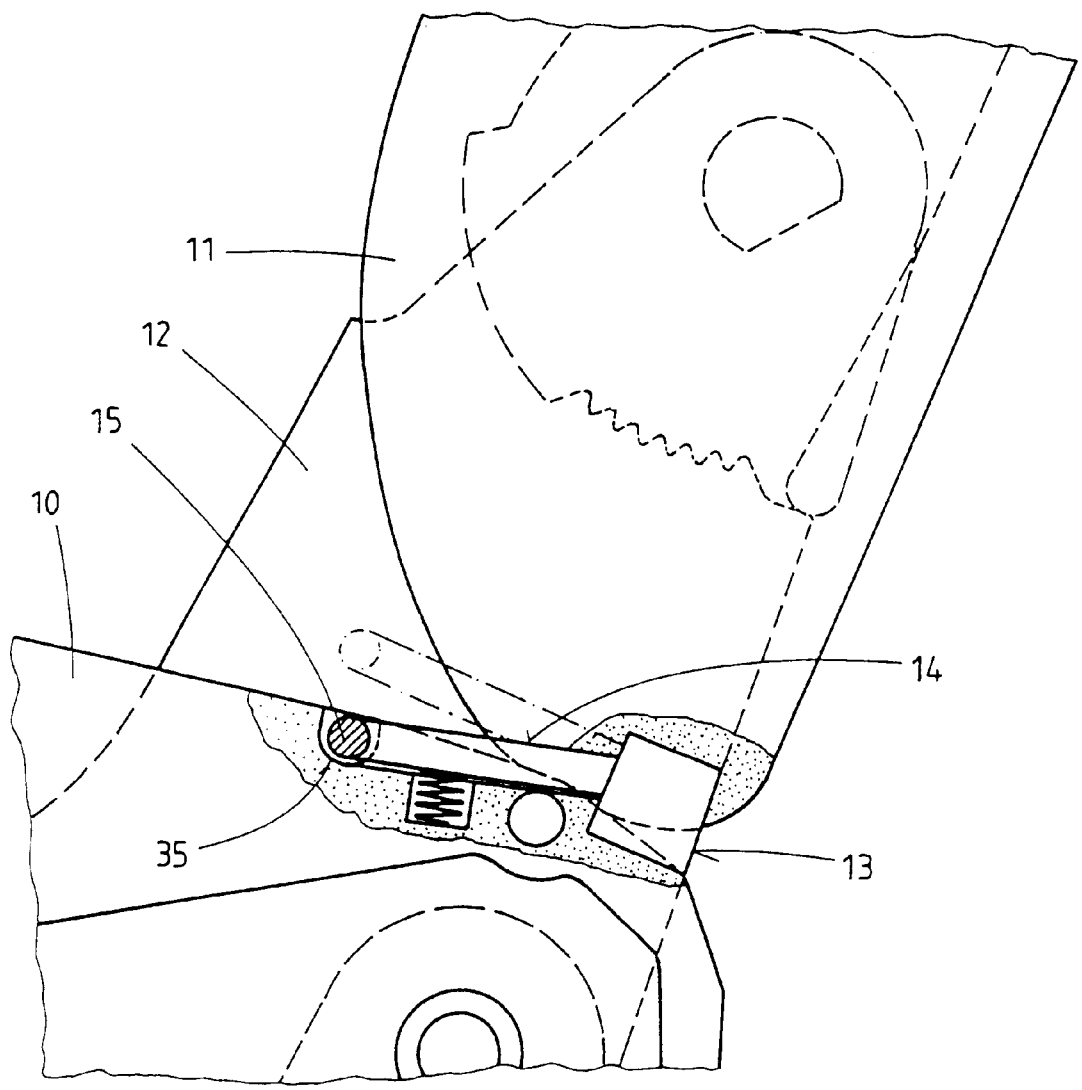
FIG. 5 shows an additional exemplary embodiment of the object of the invention, in which the fastening element installed in the rear part of the seat can be pivoted with respect to the retaining element in a plane perpendicular to the surface of the seat part.

In the exemplary embodiment shown in FIG. 5, the fastening element 14, which again has a yoke 15, is connected to the retaining element 13 by a latching mechanism (not shown). This latching mechanism, however, is designed in such a way that the fastening element can pivot in a plane perpendicular to the surface of the seat and can be moved by the previously mentioned latching mechanism into a projecting service position or into a parking position, folded onto the top surface of the seat part 10. In FIG. 5, the parking position is shown in solid line, whereas the service position of the fastening element 14 is shown in dash-dot lines. As can also be derived from FIG. 5, a recess 35, in which the yoke 15 of the fastening element 14 can be pivoted, is advantageously provided in the upholstered surface of the seat part 10.

As already mentioned, the illustrated and previously described exemplary embodiments of the object of the invention represent only examples, to which the invention is in no way limited. Additional designs and modifications of the object of the invention are also conceivable. In addition, all of the features described and illustrated in the drawings are essential to the invention, even if they are not explicitly cited in the claims.

List of reference numbers 10 seat part
11 seat back
12 hinge hardware
13 retaining element
14 fastening element
15 yoke
16 grommet plate
17 latching mechanism
18 latching stage, first
19 latching stage, second
20 energy storage mechanism
21 base body of 14
22 control tappet
23 control link
24 side of 22
25 side of 22
26 base of triangle 22
27 double arrow
28a control surface, linear
28b control surface, same slant as 25
28c control surface, linear
28d control surface, same slant as 25
28e control surface, linear
28f control surface, same slant as 25
28g control surface linear
28h control surface, same slant as 24

28*i* control surface, linear
29*a* control surface, linear
29*b* control surface, same slant as 24
29*c* control surface, linear
29*d* control surface, same slant as 24
30 arrow
30' arrow
31 angled projection
32 stop plate
33 projection on 32
34 bottom surface of 33
35 recess

What is claimed is:

1. Fastening device which fastens a child's seat to the seat of a vehicle, the device being provided with at least one retaining element attached to the seat of a vehicle, this retaining element holding a fastening element configured to be moved between a service position and a stowed position, wherein the fastening element (14) is connected to the retaining element (13) by a latching mechanism (17) configured to lower the fastening element (14) into the stowed position which is below the top surface of a seat part (10) of the seat of a vehicle and to return the fastening element (14) to the service position which is above the top surface of the seat part (10);

wherein the latching mechanism (17) between the fastening element (14) and the retaining element (13) is designed as a two-stage mechanism having a first latching stage (18) in which the fastening element (14) is in the stowed position and a second latching stage (19) in which the fastening element (14) is in the service position;

wherein the latching mechanism (17) comprises a guideway (23) provided on the retaining element (13), wherein the fastening element (14) engages the guideway (23);

wherein the fastening element (14), when actuated, is guided by the guideway (23) in a first direction from the service position into the stowed position and is guided by the guideway (23) in a second direction from the stowed position into the service position.

2. Fastening device according to claim 1, comprising an energy storage mechanism, wherein the fastening element (14) has a base body (21) with a yoke (15) and wherein the energy storage mechanism (20) forces the base body (21) in the direction of the service position, wherein the yoke (15) is configured as an attachment location for the child's seat, wherein the fastening element (14) has a control tappet (22) which engages in a linear, sliding manner in the guideway (23) of the retaining element (13), wherein the control tappet (22) and the guideway (23) are configured such that a relative transverse movement between the control tappet (23) and the guideway (23) is possible.

3. Fastening device according to claim 2, wherein the control tappet (22) projecting out from the base body (21) of the fastening element (14) has a cross section in the form of an isosceles triangle, where the base of the triangle (26), i.e., the side which connects the two equal sides (24, 25), extends in the direction of the linear movement of the fastening element (14).

4. Fastening device according to claim 3, wherein the guideway has both outer control surfaces (28*a*, 28*b*, 28*c*, 28*d*, 28*e*, 28*f*, 28*g*, 28*h*, 28*i*) and inner control surfaces (29*a*, 29*b*, 29*c*, 29*d*), the inner control surfaces being formed by an angle projection (31), and wherein the inner and outer control surfaces alternate between a course which proceeds in a linear manner parallel to the base (26) of the triangle of the control tappet (22) and a course which proceeds at a slant in the direction of one or the other of the two equal sides (24, 25).

5. Fastening device according to claim 4, wherein the control surface (29*d*) of the angled projection (31) facing the latching stages (18, 19) extends across certain areas of the two control surfaces (28*f*, 28*d*) of the latching stages (18, 19), the two of which slant in the same direction, but is itself slanted in the direction opposite that of the control surfaces (28*d* 28*f*) of the latching stages (18, 19) and is limited by a linear control surface (29*c*), which extends in the direction of motion of the control tappet (22) and points toward the slanted control surface (28*d*) of the second latching stage (19).

6. Fastening device according to claim 5, wherein the distance between the outer and inner control surfaces of the control link (23) is calculated to allow the free passage of the control tappet (22).

* * * * *